United States Patent
Krishnan et al.

(10) Patent No.: US 10,200,716 B2
(45) Date of Patent: Feb. 5, 2019

(54) PARALLEL INTRA-PREDICTION ENCODING/DECODING PROCESS UTILIZING PIPCM AND/OR PIDC FOR SELECTED SECTIONS

(71) Applicant: Sony Computer Entertainment Inc., Tokyo (JP)

(72) Inventors: Rathish Krishnan, Foster City, CA (US); Hung-Ju Lee, Pleasanton, CA (US)

(73) Assignee: Sony Interactive Entertainment Inc., Tokyo (JP)

( * ) Notice: Subject to any disclaimer, the term of this patent is extended or adjusted under 35 U.S.C. 154(b) by 371 days.

(21) Appl. No.: 14/750,762

(22) Filed: Jun. 25, 2015

(65) Prior Publication Data
US 2016/0381386 A1     Dec. 29, 2016

(51) Int. Cl.
*H04N 19/436* (2014.01)
*H04N 19/593* (2014.01)

(52) U.S. Cl.
CPC ......... *H04N 19/593* (2014.11); *H04N 19/436* (2014.11)

(58) Field of Classification Search
CPC .. H04N 19/593; H04N 19/573; H04N 19/436; H04N 7/50; H04N 19/21
USPC .................................................. 375/240.14
See application file for complete search history.

(56) References Cited

U.S. PATENT DOCUMENTS

| | | | |
|---|---|---|---|
| 6,023,296 A | 2/2000 | Lee et al. | |
| 6,157,746 A | 12/2000 | Sodagar et al. | |
| 6,236,758 B1 | 5/2001 | Sodagar et al. | |
| 6,269,192 B1 | 7/2001 | Sodagar et al. | |
| 6,298,163 B1 | 10/2001 | Sodagar et al. | |
| 6,351,491 B1 | 2/2002 | Lee et al. | |
| 6,459,814 B1 | 10/2002 | Li et al. | |
| 6,690,833 B1 | 2/2004 | Chiang et al. | |
| 6,700,932 B2 | 3/2004 | Shen et al. | |
| 6,700,935 B2 | 3/2004 | Lee | |
| 7,145,946 B2 | 12/2006 | Lee | |
| 7,372,903 B1 | 5/2008 | Lee et al. | |
| 7,426,296 B2 | 9/2008 | Lee et al. | |

(Continued)

OTHER PUBLICATIONS

International Search Report and Written Opinion for International Application No. PCT/US2016/039094, dated Sep. 13, 2016.

(Continued)

*Primary Examiner* — Jayanti K Patel
*Assistant Examiner* — Shadan E Haghani
(74) *Attorney, Agent, or Firm* — JDI Patent; Joshua D. Isenberg; Robert Pullman

(57) ABSTRACT

Digital pictures may be encoded and decoded in a way that optimizes parallelization. Selected sections of a digital picture in a first list are encoded independently of encoding any of their neighbor sections. Sections in a second list located to the right of corresponding sections in the first list are encoded using at most the section to their immediate left. Sections in a third list located to the right of a corresponding section in the second list and immediately below a corresponding section in the first list are encoded using at most the sections to the immediate left, immediately above and immediately to its above-right. All other sections of the picture may be encoded in a normal manner.

11 Claims, 12 Drawing Sheets

| Above Left MB | Above MB | Above Right MB |
|---|---|---|
| Left MB | Curr MB | |

(56) References Cited

U.S. PATENT DOCUMENTS

| | | |
|---|---|---|
| 7,697,608 B2 | 4/2010 | Lee |
| 7,697,783 B2 | 4/2010 | Lee et al. |
| 7,929,608 B2 | 4/2011 | Krishnan |
| 8,027,384 B2 | 9/2011 | Lee |
| 8,077,769 B2 | 12/2011 | Krishnan |
| 8,184,699 B2 | 5/2012 | Krishnan |
| 8,218,627 B2 | 7/2012 | Lee |
| 8,345,750 B2 | 1/2013 | Lee |
| 8,379,718 B2 | 2/2013 | Wang et al. |
| 8,711,933 B2 | 4/2014 | Lee |
| 8,737,485 B2 | 5/2014 | Zhang et al. |
| 8,848,799 B2 | 9/2014 | Krishnan et al. |
| 8,879,623 B2 | 11/2014 | Lee |
| 8,913,664 B2 | 12/2014 | Lee |
| 2002/0126754 A1 | 9/2002 | Shen et al. |
| 2003/0026336 A1 | 2/2003 | Lee |
| 2003/0156198 A1 | 8/2003 | Lee |
| 2005/0053296 A1 | 3/2005 | Srinivasan et al. |
| 2005/0117646 A1 | 6/2005 | Joch et al. |
| 2005/0169369 A1 | 8/2005 | Lee |
| 2005/0169370 A1 | 8/2005 | Lee |
| 2005/0207643 A1 | 9/2005 | Lee et al. |
| 2007/0025621 A1 | 2/2007 | Lee et al. |
| 2007/0237224 A1 | 10/2007 | Krishnan |
| 2007/0237235 A1 | 10/2007 | Krishnan |
| 2007/0274396 A1 | 11/2007 | Zhang et al. |
| 2008/0181311 A1 | 7/2008 | Zhang et al. |
| 2010/0150227 A1 | 6/2010 | Lee |
| 2010/0150228 A1 | 6/2010 | Lee |
| 2010/0238998 A1* | 9/2010 | Nanbu ................ H03M 7/4006 375/240.03 |
| 2011/0051806 A1 | 3/2011 | Lee |
| 2011/0051809 A1 | 3/2011 | Lee |
| 2011/0051811 A1 | 3/2011 | Wang et al. |
| 2011/0051813 A1 | 3/2011 | Krishnan et al. |
| 2011/0158317 A1 | 6/2011 | Krishnan |
| 2011/0235699 A1* | 9/2011 | Huang ................ H03M 7/4006 375/240.02 |
| 2011/0260893 A1 | 10/2011 | Sato et al. |
| 2012/0033730 A1 | 2/2012 | Lee |
| 2013/0072299 A1 | 3/2013 | Lee |
| 2013/0089266 A1* | 4/2013 | Yang ..................... H04N 19/50 382/238 |
| 2013/0156103 A1 | 6/2013 | Wang et al. |
| 2014/0064372 A1* | 3/2014 | Laroche .................. H04N 7/50 375/240.16 |
| 2014/0087877 A1 | 3/2014 | Krishnan |
| 2014/0161172 A1 | 6/2014 | Wang et al. |
| 2014/0233640 A1 | 8/2014 | Lee |
| 2015/0016513 A1 | 1/2015 | Lee |
| 2015/0063440 A1 | 3/2015 | Pang et al. |

OTHER PUBLICATIONS

Sullivan et al. "Video compression-from concepts to the H. 264IAVC standard." In: Proceedings of the IEEE. Jan. 2005 (Jan. 2005) Retrieved from ~http://Ice.sharif.ac.irlcourses187-88I2Ice342/resourcesIroot/H264%20StandardIpieee~sullivan~wiegand~dec2004pedntfi re document.

Marpe, D., Schwarz, H., and Wiegand, T., Context-Based Adaptive Binary Arithmetic Coding in the H.264/AVC Video Compression Standard, IEEE Trans. Circuits and Systems for Video Technology, vol. 13, No. 7, pp. 620-636, Jul. 2003.

N. Keshaveni, S. Ramachandran,.and K.S. Gurumurthy, "Implementation of Context Adaptive Variable Length Coder for H.264 Video Encoder", International Journal of Recent Trends in Engineering, vol. 2, No. 5, Nov. 2009.

* cited by examiner

|Above Left MB|Above MB|Above Right MB|
|---|---|---|
|Left MB|Curr MB| |

| 0 | 1 | 2 | 3 | 4 | 5 | 6 | 7 | 8 | 9 | 10 | 11 | 12 | 13 | 14 | 15 |
|---|---|---|---|---|---|---|---|---|---|----|----|----|----|----|----|
| 2 | 3 | 4 | 5 | 6 | 7 | 8 | 9 | 10 | 11 | 12 | 13 | 14 | 15 | 16 | 17 |
| 4 | 5 | 6 | 7 | 8 | 9 | 10 | 11 | 12 | 13 | 14 | 15 | 16 | 17 | 18 | 19 |
| 6 | 7 | 8 | 9 | 10 | 11 | 12 | 13 | 14 | 15 | 16 | 17 | 18 | 19 | 20 | 21 |
| 8 | 9 | 10 | 11 | 12 | 13 | 14 | 15 | 16 | 17 | 18 | 19 | 20 | 21 | 22 | 23 |
| 10 | 11 | 12 | 13 | 14 | 15 | 16 | 17 | 18 | 19 | 20 | 21 | 22 | 23 | 24 | 25 |
| 12 | 13 | 14 | 15 | 16 | 17 | 18 | 19 | 20 | 21 | 22 | 23 | 24 | 25 | 26 | 27 |
| 14 | 15 | 16 | 17 | 18 | 19 | 20 | 21 | 22 | 23 | 24 | 25 | 26 | 27 | 28 | 29 |

FIG. 2

PARALLEL INTRA-PREDICTION ENCODING/DECODING PROCESS UTILIZING PIPCM AND/OR PIDC FOR SELECTED SECTIONS

FIELD OF THE DISCLOSURE

Aspects of the present disclosure are related to encoding and decoding compressed bitstreams. In particular, aspects of the present disclosure are related to strategies for the creation of bitstreams that allow parallel intra-prediction for encoding and decoding.

BACKGROUND

Video encoding and decoding involves several processes that can be parallelized and be effectively implemented on multi-processors and a graphics processing unit (GPU). Motion estimation and Transform/Scaling are examples of processes that have no dependencies on neighboring blocks, making it highly suitable for implementing on the GPU. Other processes such as intra-prediction and deblocking, however, have dependencies on neighboring blocks.

For H.264 intra-prediction, there are nine luma prediction modes for the 4×4 block size and four modes for 16×16 block size. Each 4×4 block has 16 luma or chroma samples and each 16×16 block has 256 luma samples. A luma sample represents the monochrome signal and a chroma sample represents one of the two color difference signals related to the primary colors. For the 4×4 luma intra-prediction, depending on the mode, a macroblock may predict from the following neighbors as shown in FIG. 1A:
  Above-Left Macroblock
  Above Macroblock
  Above-Right Macroblock
  Left Macroblock Having dependencies on neighbors restricts the number of macroblocks that can be processed in parallel. It also necessitates synchronization points that ensure that macroblocks are not processed before their neighbors are ready. The number of macroblocks that are processed between the synchronization steps is not constant, and it takes several synchronization steps before peak parallelism is reached in terms of macroblock processing rate. It is difficult to parallelize intra-prediction for a decoder. In particular, efficient parallelization is not currently possible if there is only one slice per frame, which may happen if the encoder does not create bitstreams tailored to maximize the performance of the decoder. These issues are not eliminated even when decoding multiple slices with a GPU. Due to these issues, processes such as intra-prediction cannot make full use of a GPU's processing capability. It is within this context that aspects of the present disclosure arise.

BRIEF DESCRIPTION OF THE DRAWINGS

The teachings of the present disclosure can be readily understood by considering the following detailed description in conjunction with the accompanying drawings, in which:

FIG. 2 is a schematic diagram illustrating conventional single-slice wavefront block processing order.

DESCRIPTION OF THE DRAWINGS

Although the following detailed description contains many specific details for the purposes of illustration, anyone of ordinary skill in the art will appreciate that many variations and alterations to the following details are within the scope of the invention. Accordingly, the exemplary embodiments of the invention described below are set forth without any loss of generality to, and without imposing limitations upon, the claimed invention.

INTRODUCTION

In the context of embodiments of the present invention, video data may be broken down in suitable sized units for coding and decoding. For example, in the case of video data, the video data may be broken down into pictures with each picture representing a particular image in a series of images. Each unit of video data may be broken down into sub-units of varying size. Generally, within each unit there is some smallest or fundamental sub-unit. In the case of video data, each video frame may be broken down into pixels, each of which contains luma (brightness) and chroma (color) data.

Figures 1A, 1B:
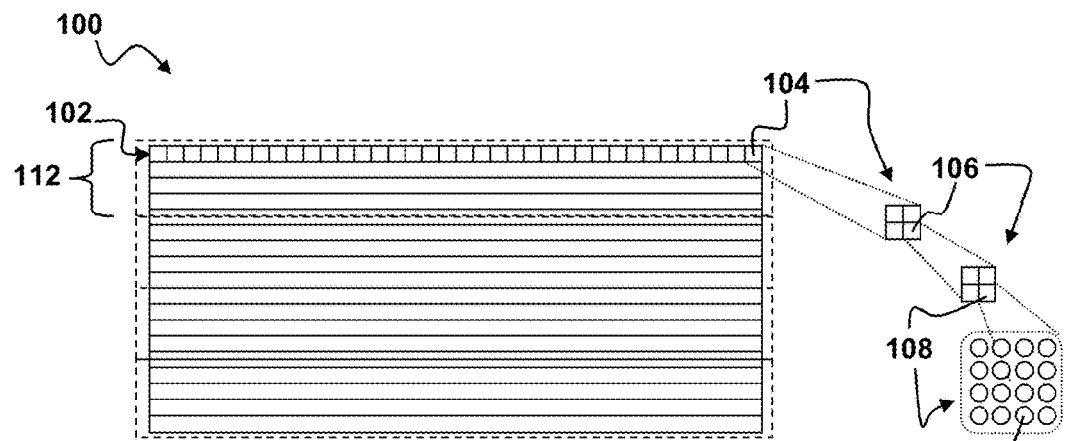
FIG. 1A is a schematic diagram of a portion of a digital picture illustrating an example of data dependencies for 4×4 Intra-prediction.
FIG. 1B is a schematic diagram illustrating one possible division of a video data picture within the context of the present disclosure.

By way of example, and not by way of limitation, as shown in FIG. 1B, a single picture 100 (e.g., a digital video frame) may be broken down into one or more sections. As used herein, the term "section" can refer to a group of one or more luma or chroma samples within the picture 100. A section can range from a single luma or chroma sample within the picture, up to the whole picture. Non-limiting examples of sections include, but are not limited to slices 102, blocks 104 (e.g., 16×16 sample), sub-blocks 106 (e.g., 8×8 sample), partitions 108 (e.g., 4×4 sample) and individual luma or chroma samples 110. As illustrated in FIG. 1B, each slice 102 contains one or more rows of blocks 104 or portions of one or more such rows. The number of blocks in a row depends on the size of the blocks and the size and resolution of the picture 100. For example, if each block contains sixteen by sixteen luma samples then the number of blocks in each row may be determined by dividing the width of the picture 100 (in luma samples) by sixteen. Each block 104 may be broken down into a number of sub-blocks 106. Each sub-block 106 may be broken down into a number of partitions 108 and each partition may contain a number of luma or chroma samples 110. By way of example, and without limitation of the invention, in a common video coding scheme, each block 104 may be broken down into four sub-blocks 106. Each sub-block may be broken down into four partitions 108 and each partition may contain a four by four arrangement of sixteen luma or chroma samples 110.

Conventionally, video images have been decoded using a single thread for the decoding of each picture or the decoding of each slice. In a conventional single-thread decoder all decoding tasks for one block are completed before decoding the next block. Multithreaded picture decoding—i.e., decoding multiple pictures in parallel, may also be done. To facilitate multi-threaded decoding within pictures, each picture 100 may be broken down into two or more sections 112 that encompass one or more slices.

The video decoding of H.264/AVC or HEVC compressed bitstreams requires significant computing power. For high resolution or high quality video bitstreams, pure CPU based solutions might not achieve real-time decoding performance. Performing some video decoding processes on the GPU, while using the CPU to perform other video decoding tasks, is a popular approach that can speed up the video decoding process.

GPUs are extremely efficient at computations which have high arithmetic intensity, involve large data sets and have few data dependencies. While the first two constraints are satisfied for most video decoding tasks, the last constraint is not. Decoding processes such as intra-prediction and deblocking involve dependencies on neighboring blocks. For intra-prediction, a block may have dependencies on one or more of four adjacent blocks. Due to these dependencies, implementing intra-prediction on the GPU is inefficient and for worst-case dependency, there are periods where only a small number blocks are actively processed on the GPU. Aspects of the present disclosure improve decoder performance for worst-case dependency and for typical cases as well.

Algorithms used in image and video processing that have dependencies on neighboring blocks are difficult to implement efficiently on multi-processors, which require large data sets that can be processed independently with minimal or no synchronization. Intra-prediction, as defined in the H.264 or HEVC standard, is one example of a process that is challenging to implement on the GPU due to the dependencies of a block on neighbors. Existing techniques make such modules GPU-friendly by processing blocks using a processing order as shown in FIG. 2. A block numbered N can be processed once neighboring blocks smaller than N are processed. All blocks represented with the same number can be processed in parallel. For simplicity, the blocks that can be processed in parallel are represented by a list corresponding to the block number. From FIG. 2, List 8 would consist of four blocks, and List 15 would consist of eight blocks. Each list includes all blocks that can be encoded simultaneously and decoded simultaneously during the intra-prediction process.

Utilizing 'slices' is a popular method to achieve parallelism for H.264 or HEVC bitstreams, as this approach eliminates the dependency on neighbors at the slice boundary. However, dividing a picture into multiple slices reduces the compression efficiency due to the requirement of slice headers, and this might not suited for low bitrate applications. Also, the ramp-up period to reach peak block processing rate is still not eliminated even with 8 or 17 slices per picture for 1080 p video content. Aspects of the present disclosure include two proposed methods of encoding bitstreams that allow efficient processing of Intra-prediction on the GPU during the decoding process, even for single-slice bitstreams. These methods achieve peak block processing rate on the GPU throughout the execution and reduces the number of synchronization points needed, even for worst-case dependency.

Another reason for dividing a video picture into multiple slices is for better error resilience. When single-slice bitstreams are used, any error in the residual coefficient data of I-picture results in incorrect decoded data starting from the block containing the error to the last block in the picture. With multiple-slices, the incorrect decoded data due to the error can be limited to the end of the slice. The proposed methods could be used for creating many sections within a picture that could be decoded independently of each other, while requiring fewer slices. For an I-picture configuration that requires a specific number of independent sections or a specific number of blocks per independent section, current methods use a different slice for each independent section. This has the drawback of requiring a significant number of extra bits due to inefficient prediction and slice header overhead. A method of achieving similar number of independent sections with better prediction and fewer bits has been proposed.

For H.264 the common approach to improve parallelism is to utilize multiple slices, where each slice can be encoded or decoded virtually independent of other slices. But each slice reduces compression efficiency due to the overhead of slice header and the increase in bits needed for macroblocks at the slice boundary. In this document, a block is used to define a basic coding unit, such as a macroblock for H.264 or a Coding Tree Block (CTB) for HEVC. The prediction unit size could be smaller than the block size.

The proposed methods could be used for creating sections of a picture for which decoding processes could be performed independently of each other, without requiring multiple-slices. This can be used to speed up the encoding and decoding processes that have dependencies on neighboring blocks, and also for improving error resilience for I-pictures. When multiple slices are used, the proposed methods can achieve much higher levels of parallelism with fewer slices compared to normal encoding and decoding.

Modern GPUs are capable of performing general purpose computations in addition to graphics tasks. Such general purpose GPU (GPGPU) code can be programmed using compute shaders, which determines the number of threads used in a thread group. A 'dispatch' function is used to execute a compute shader on the GPU, and determines the number of thread groups that are launched. Ideally, only a single dispatch is required for a compute shader without any dependencies. However, tasks such as intra-prediction need synchronization once a list of blocks have been processed, so that the data needed for processing the next batch of blocks are ready. GPUs need a large number of threads to be run in parallel in order to perform efficiently. For intra-prediction, a large number of blocks should be processed per dispatch for efficient utilization of the GPU.

Figure 3:
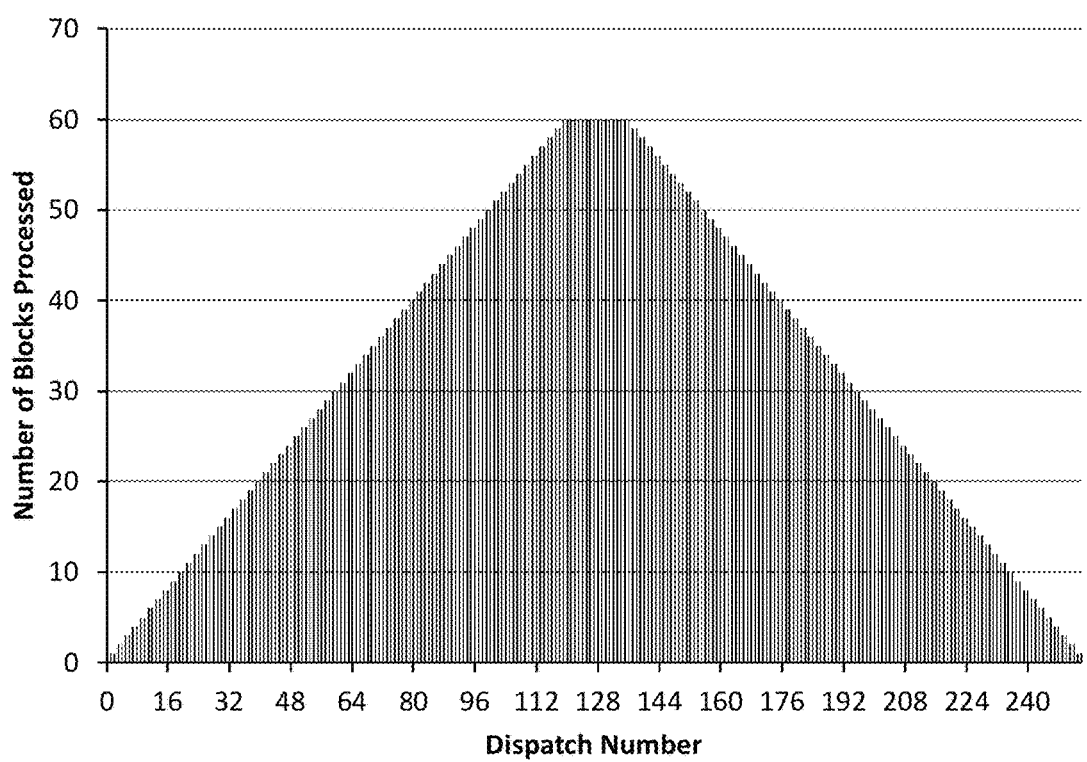
FIG. 3 is a graph illustrating the number of blocks that can be processed conventionally during each run of a compute shader that performs Intra-prediction for a 1080 p picture with worst-case dependency, where the basic coding unit is assumed to be 16×16.

FIG. 3 shows the number of blocks that can be processed during each run of the compute shader for a 1080 p picture with worst-case dependency, where the basic coding unit is assumed to be 16×16. To process the entire picture, 254 dispatches are needed which equates to a similar number of synchronization steps. Also, there are periods near the beginning and end of the decoding where only a small number of blocks are actively processed on the GPU.

The particular example shown in FIG. 3 is for decoding a single-slice frame encoded using H.264 on a GPU. The height of each spike shows number of macroblocks (MB) processed per GPU dispatch for Intra-prediction. It is noted that H.264 uses 16×16 MB size, but the Intra-prediction process could alternatively use 16×16, 8×8 or 4×4 sized partitions as the basic unit of prediction for each MB. The HEVC standard by contrast uses sections called coding tree units (CTU), which can be from 16×16 pixels up to 64×64 pixels, with smaller partition sizes for prediction units. The worst case generally involves encoding the smallest prediction unit size possible and there is data dependency on the left neighbor and upper right neighbor.

A common method to break the dependencies on neighboring blocks is to employ slices or tiles while encoding the bitstream. H.264 and HEVC standards define slices and tiles, which are sections of the picture that contain integer number of coding blocks, and can be encoded or decoded nearly independently of other slices or tiles. However, using a large number of slices/tiles reduces the compression efficiency due to the overhead of header bits and because a large number of slices creates a large number of blocks at the boundary for which the prediction will be sub-optimal. A block with sub-optimal prediction can be defined as one that will not have the option to choose from all the prediction modes available for a similar single-slice stream. Such sub-optimal blocks will have a greater number of residual coefficients, which need more bits for encoding.

While multiple slices improves parallelism, the ramp-up period to reach peak block processing rate on the GPU is still not eliminated even with 8 or 17 slices per picture for 1080 p video content. According to aspects of the present disclosure, the benefits of multiple slices such as improved parallelism could be obtained without needing multiple slices, which leads to lower slice header bits and fewer sub-optimal prediction blocks. Aspects of the present disclosure can achieve peak block processing rate on a GPU throughout the execution and reduces the number of synchronization points needed for worst-case dependency. For applications that require multiple slices per picture, these methods may help reduce the number of slices needed.

EMBODIMENTS

Aspects of the present disclosure overcome problems with image and video processing that have dependencies on neighboring blocks that arise when attempting to implement such algorithms efficiently on multi-processors. Aspects of the present disclosure may be implemented with slightly modified encoders and existing optimized decoders. Examples of existing coding standards that may be used include current versions of HEVC and H.264 and also JPEG or any other block based coder that has the same issue of dependency on neighbors and can choose which neighbors it uses to code a particular block. The pattern of dependencies typically depends on the frame resolution, which includes the aspect ratio. The number of sections that can be decoded per dispatch in parallel may be maximized by breaking up the dependencies. Encoding selected sections in an independent manner and limiting the encoding options for certain sections neighboring the selected blocks as described herein can reduce or eliminate dependencies and thereby allow for efficient encoding and decoding using parallel processing. A key feature of aspects of the present disclosure is the selection of the sections that are encoded independently.

Figure 4A:
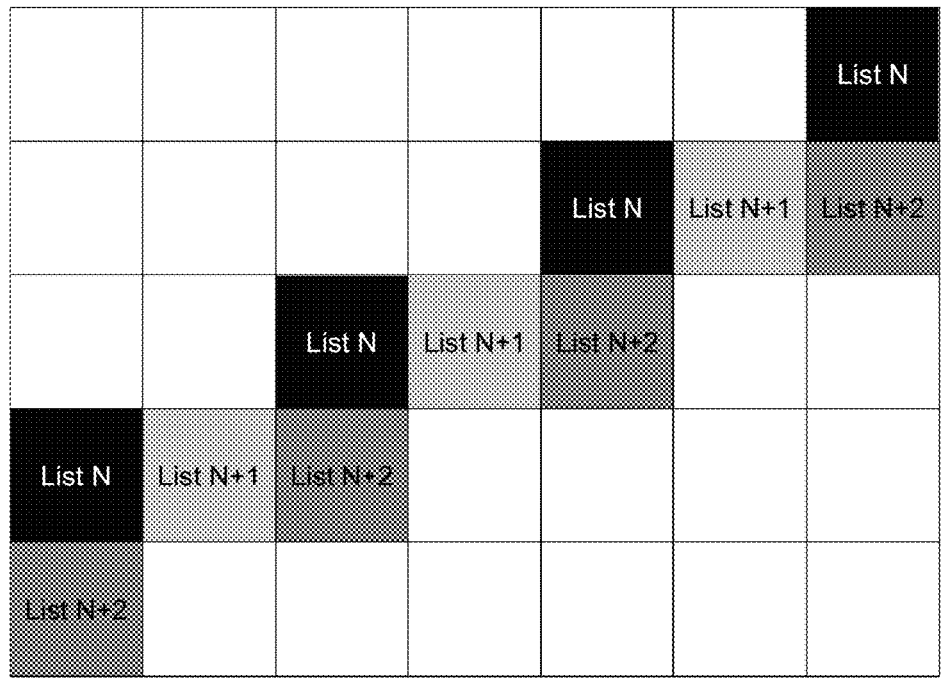
FIG. 4A is a schematic diagram of a portion of a digital picture illustrating an encoding strategy used to create bitstreams that allow parallel intra-prediction in accordance with aspects of the present disclosure.

According to aspects of the present disclosure, the selected sections that are encoded independently belong to the same list number N. To choose N, consider the example shown in FIG. 3. In this case the number of sections (e.g., blocks) processed per dispatch ramps up to a maximum and then declines. List number N may be chosen as the dispatch number where the number of sections processed per dispatch during decoding decreases after the maximum. In the example shown in FIG. 3, this is dispatch number 136. In FIG. 4A, sections in list N are encoded in an independent manner such that they can be decoded independent of any neighboring sections. These sections can be decoded in parallel without having to wait until any of their neighbor blocks are decoded. Sections in list N+1, which are to the right of the blocks in list N are encoded using modes that allow the blocks to be decoded using their left neighbors only. Examples of such modes in H.264 for 4×4 and 8×8 partition sizes include modes known as "horizontal" and "horizontal-up". For 16×16 prediction unit size, such modes include the "horizontal" mode. Sections in list N+2, which are those below the sections in list N and to the right of those in list N+1, can be encoded with modes that do not use the above-left blocks for prediction. For 4×4 and 8×8 partition sizes, sections in list N+2 may use any mode other than "diagonal-down-right", "vertical-right", or "horizontal-down" in the H.264 coding standard. The modes that may be used are "vertical", "horizontal", "DC", "diagonal-down-left", "vertical-left" or "horizontal-up". For 16×16 prediction unit size, any mode other than "plane" may be used for sections in list N+2. The modes that may be used for this case are "vertical", "horizontal" and "DC".

By way of example, and not by way of limitation, dependencies on neighboring blocks for H.264 Luma Intra-Prediction of 4×4 and 8×8 section sizes for different intra-prediction modes are shown in Table I below.

TABLE I

| Name of Prediction Mode | Above | Above Right | Left | Above Left |
|---|---|---|---|---|
| Vertical | Yes | | | |
| Horizontal | | | Yes | |
| DC | If Available | | If Available | |
| Diagonal_Down_Left | Yes | Yes | | |
| Diagonal_Down_Right | Yes | | Yes | Yes |
| Vertical_Right | Yes | | Yes | Yes |
| Horizontal_Down | Yes | | Yes | Yes |
| Vertical_Left | Yes | Yes | | |
| Horizontal_Up | | | Yes | |

By way of further example, and not by way of limitation, dependencies on neighboring blocks for H.264 Luma Intra-Prediction of 16×16 section sizes for different intra-prediction modes are shown in Table II below.

TABLE II

| Name of Prediction Mode | Above | Left | Above Left |
|---|---|---|---|
| Vertical | Yes | | |
| Horizontal | | Yes | |
| DC | If Available | If Available | |
| Plane | Yes | Yes | Yes |

Encoding digital pictures in the strategy illustrated in FIG. 4A can create bitstreams that allow parallel intra-prediction. In this method, all sections in List N are encoded in such a way that it does not predict from any neighboring sections. The sections in List N+1 only use the luma or chroma samples from the neighbor section to its left for prediction. The sections in List N+2 do not predict from the neighbor section to the above-left, but can predict from the above, left, and above-right neighbor sections. This strategy allows all sections to the right and below List N to be decoded independent of all blocks to the left and above List N. The prediction modes can be chosen according to the strategy described above by disabling certain prediction modes based on the block size, or by modifying the parameters that determine if the neighboring blocks are available. For example, in the case of H.264 4×4 intra-prediction, for the blocks in List N+1, the encoder may disable all modes except Intra_4×4_Horizontal and the Intra_4×4_Horizontal_Up prediction modes.

Two implementations are proposed that allow encoding of blocks in List N without predicting from any neighboring blocks. According to a first implementation, all blocks in List N are encoded using pulse code modulation (PCM) by directly representing the sample values without prediction or application of a transform. Both H.264 and HEVC have the concept of PCM in which no prediction is done and the encoding is lossless. This mode can be invoked to break up the data dependencies. The PCM mode is a lossless mode and blocks encoded using this mode use a large number of bits compared to other modes. This is not a problem for high bitrate applications, e.g., Blu-Ray players. This technique of achieving parallel intra-prediction using PCM, is referred to as PIPCM hereafter. PIPCM allows any optimized GPU-based decoder or multi-threaded decoder to efficiently and quickly decode bitstreams created using this technique. An additional advantage to PIPCM is that no modification is needed to the decoder in order to decode pictures encoded in this fashion.

A second implementation uses an encoding mode commonly known as the "DC" mode in intra-prediction to break the dependency on neighboring blocks. In DC the encoder calculates an average of the boundary luma or chroma samples to left of the section that is to be encoded and the boundary luma or chroma samples above the section that is to be encoded and uses the calculated average for intra-prediction. If only one of the section to the left and the section above is available, the DC mode uses the available section for encoding. If neither the section to the left nor the section above is available the DC mode uses a fixed value (e.g., 128 for 8 bit pixels) to encode the section. Implementations that use the DC mode to independently encode selected sections is referred to as Parallel intra-prediction using DC or PIDC hereafter.

As with PIPCM, PIDC involves modification of the encoder to properly encode the pictures so that they can be efficiently decoded in parallel. Unlike PIPCM, however, PIDC also requires modification of the decoder to correctly reconstruct the decoded picture. Therefore, this method is most suitable for applications where both the encoder and decoder can be controlled and modified. Examples of such a system could be an application for which the encoding and decoding are both done using the same device or related devices for which both the encoding and the decoding processes can be controlled by a common entity.

To encode pictures using PIDC, the encoder may be modified to ignore the fact that the left and above neighbors are available for sections in list N so that the sections in list N are always as encoded with a fixed value using DC mode. In order to properly decode pictures encoded in this way, the decoder is also modified to ignore the fact that the above and left neighbors of the list N sections are available.

The determination of list number N may depend on the height of the picture in terms of the relevant section size and how the picture is encoded. By way of example and not by way of limitation, if the picture height in units of blocks is represented as MB_h, the value of N for PIDC encoded pictures is: N=(2*MB_h), when Mb_h is even and N=(2*MB_h−2), when Mb_h is odd. For PIPCM encoded pictures, the value of N is: N=(2*MB_h−1), when Mb_h is even and N=(2*MB_h−3), when Mb_h is odd.

Figure 4B:
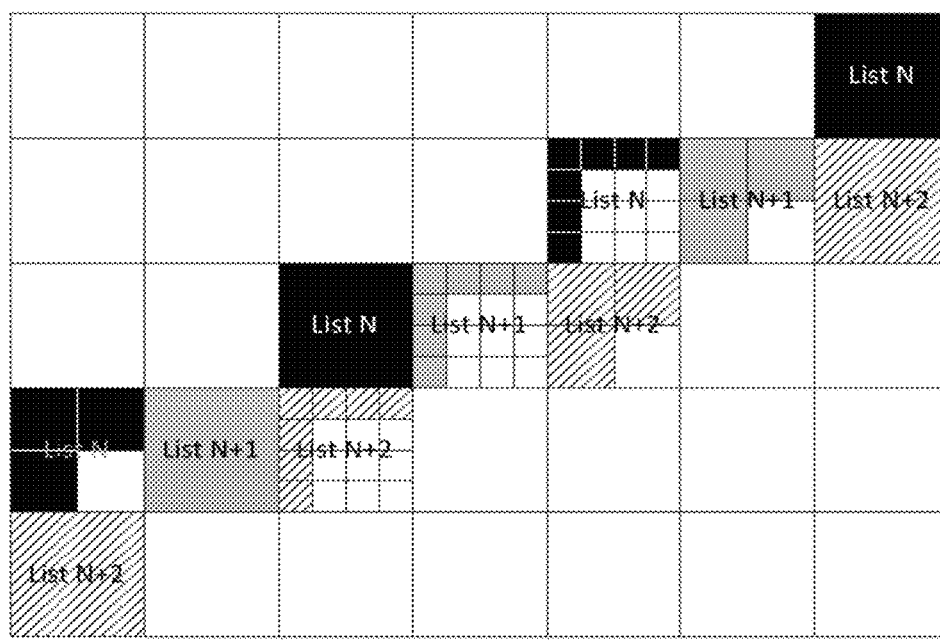
FIG. 4B is a schematic diagram of a portion of a digital picture illustrating an alternative encoding strategy used to create bitstreams that allow parallel intra-prediction in accordance with aspects of the present disclosure.

Depending on the encoding mode (PIDC or PIPCM) mode restrictions need not necessarily be enforced for all subsections of the sections in lists N, N+1, and N+2. For PIPCM mode, the H.264 standard does not allow different modes for different sub-units of a section, and so the mode is for the entire section, e.g., an entire 16×16 prediction unit. However, for in PIDC mode, while all sections in list N may be set to be encoded as DC, it may be sufficient to only enforce the DC mode restriction for the subsections of those sections (e.g., the sub-blocks or partitions in a block in list N) that are adjacent to the left or top neighbor. An example of this is shown in FIG. 4B. The remaining subsections represented in white could be encoded using any available mode. For a block in list N+1, it is sufficient to enforce the mode restrictions for the subsections shown in gray (those that are adjacent to the left or top neighbor). Within the sections containing those subsections, the subsections represented in white, could be encoded using any mode. Similarly, for a block in list N+2, it is sufficient to enforce the mode restrictions for the subsections shown with the diagonal pattern (those that are adjacent to the left or top neighbor). The subsections represented in white, could be encoded using any mode.

The encoder may decide how to partition each block in order to minimize the prediction error, which in turn minimizes the number of bits needed to encode the residual data. The encoder may use a metric such as Sum of Absolute Differences (SAD) to determine which partition size would minimize the number of bits needed to encode the block. By way of example, and not by way of limitation, if a 16×16 block has a flat area with no fine detail, encoding the block entirely as 16×16 may result in the least bits used. Alternatively, if there is a lot of fine detail in a 16×16 block, then splitting it into smaller sized sub-units (e.g., 8×8 sub-blocks or 4×4 partitions) and using different modes for two or more of the smaller sized sub-unit may reduce or minimize the number of bits needed to encode the block.

In example illustrated in FIG. 4B, it is assumed that each block is 16×16, although aspects of the present disclosure are not limited to such implementations. If the entire block is shaded, the block has been encoded using a 16×16 Intra-prediction mode. If three of the four sub-blocks are shaded, it represents 8×8 Intra-prediction. If seven of the sixteen 4×4 partitions are shaded, it represents 4×4 Intra-prediction.

It is noted that even if a section (e.g., a 16×16 block) in list N is split into smaller sized sub-units (e.g., 8×8 sub-blocks or 4×4 partitions), the section as a whole can be encoded independently of any of its neighboring sections (e.g., neighboring 16×16 blocks). Similarly, if a section (e.g., a 16×16 block) in list N+1 is split into smaller sized sub-units, the section as a whole can be encoded using at most the section to its immediate left. Likewise a section (e.g., a 16×16 block) in list N+2 is split into smaller sized sub-units (e.g., 8×8 sub-blocks or 4×4 partitions), the section as a whole can be encoded using at most the sections to its immediate left, immediately above it and immediately to its above-right.

Figure 5:
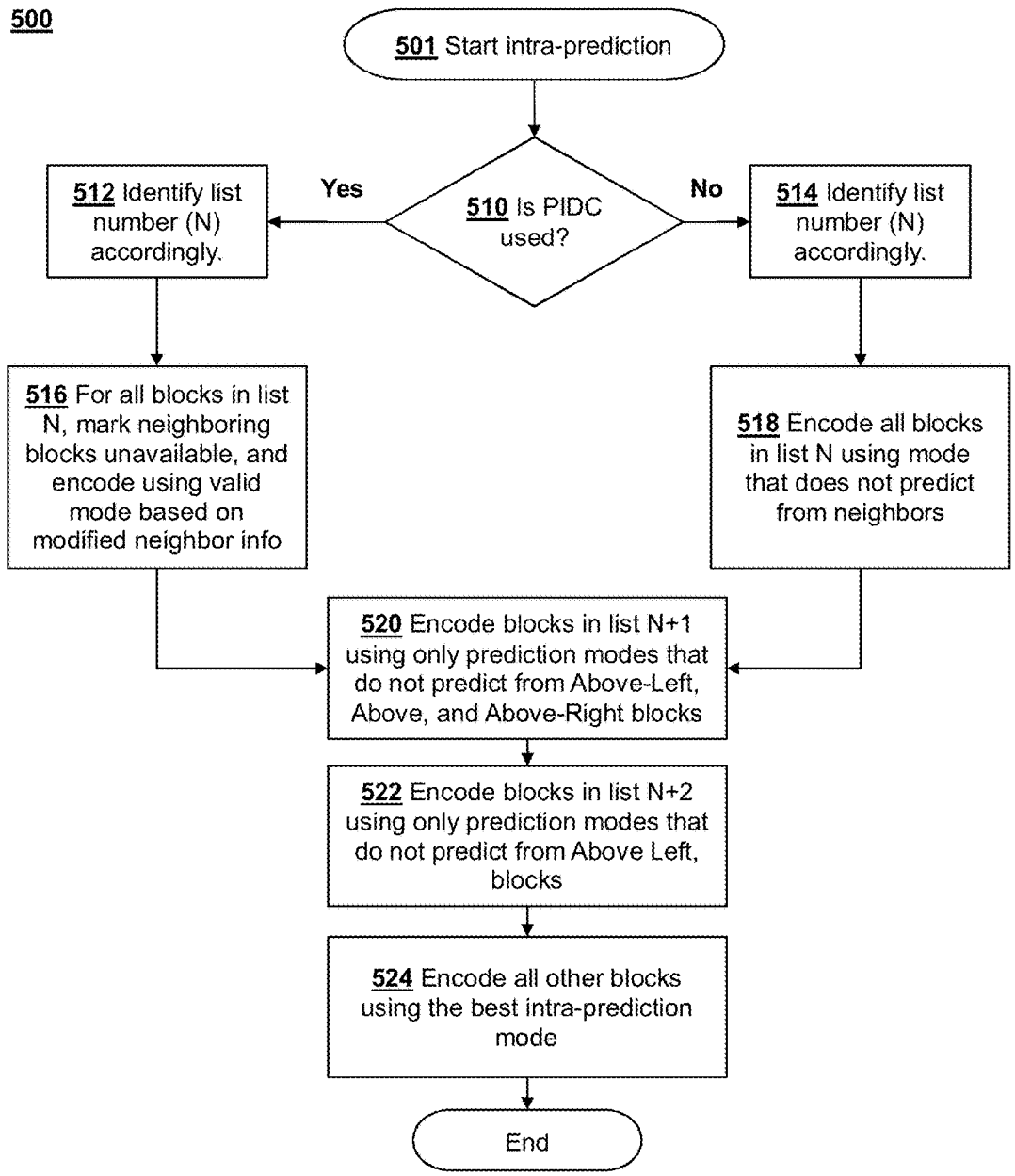
FIG. 5 is a flow diagram illustrating an example of picture encoding in accordance with aspects of the present disclosure.

FIG. 5 provides an illustrative example of parallel intra-prediction encoding according to an aspect of the present disclosure. In particular, FIG. 5 depicts an example process flow 500 for encoding a digital picture using parallel intra-prediction encoding in accordance with certain implementations of the present disclosure. It is important to note that the example of FIG. 5 is only a simplified example for purposes of illustrating only certain aspects of how a digital picture may be encoded in accordance with the present disclosure.

At the outset, it is important to note that in this example, a digital picture is undergoing the encoding process via the activity of a system utilizing PIPCM and/or PIDC. In this example, as shown in FIG. 5, intra-prediction is started 501 on the digital picture. In certain implementations, the system may utilize PIPCM to encode the sections in list number (N). In alternative implementations, the system may utilize PIDC to encode the sections in list number (N). Depending on a variety of factors described above, an appropriate encoding method may be chosen 510. By way of example, and not by way of limitation, one such factor is whether or not it is known that the picture being encoded will be decoded by a decoder that is compatible with PIDC. In some cases this information may be known beforehand. In other cases it may be necessary for the system performing the encoding to query the system that performs the decoding in order to determine whether the decoder is compatible with PIDC. In some situations, the query and its response may be transmitted over a network, which may be a personal area network, local area network, wide area network, wireless network, fiber optic network, satellite transmission network or other network between two remotely located systems.

In certain embodiments, PIDC may be utilized, and the system may identify the list number (N) accordingly 512. The identification of list number (N) is done for maximum parallelism, and as an example, can be based on video resolution, or in alternative embodiments, (N) may be defined based on a predetermined rule set known to both the encoder and decoder utilized. For all blocks in list N, neighboring blocks are marked unavailable, and the blocks are encoded 516 using a valid mode (e.g., DC) based on modified neighbor information. Subsequently, the blocks in list N+1 are encoded 520 using only prediction modes that do not predict from the Above-Left, Above, and Above-Right blocks. Blocks in list N+2 are encoded 522 using only prediction modes that do not predict from the Above-Left blocks. Finally, all other blocks in the picture are encoded 524 using the best intra-prediction mode.

In alternative embodiments, wherein PIDC is not utilized, the system may identify list number (N) accordingly 514. The identification of list number (N) is done for maximum parallelism, and as an example, can be based on video resolution, or in alternative embodiments, (N) may be defined based on a predetermined rule set. All blocks in list N have at least some subsections thereof encoded 520 using a mode that does not predict from neighbors, e.g. PCM. Subsequently, the blocks in list N+1 have at least some subsections thereof encoded 520 using only prediction modes that do not predict from the Above-Left, Above, and Above-Right blocks. Blocks in list N+2 have at least some sub-sections encoded 522 using only prediction modes that do not predict from the Above-Left blocks. Finally, all other blocks in the picture are encoded 524 using the best intra-prediction mode.

Figure 6:
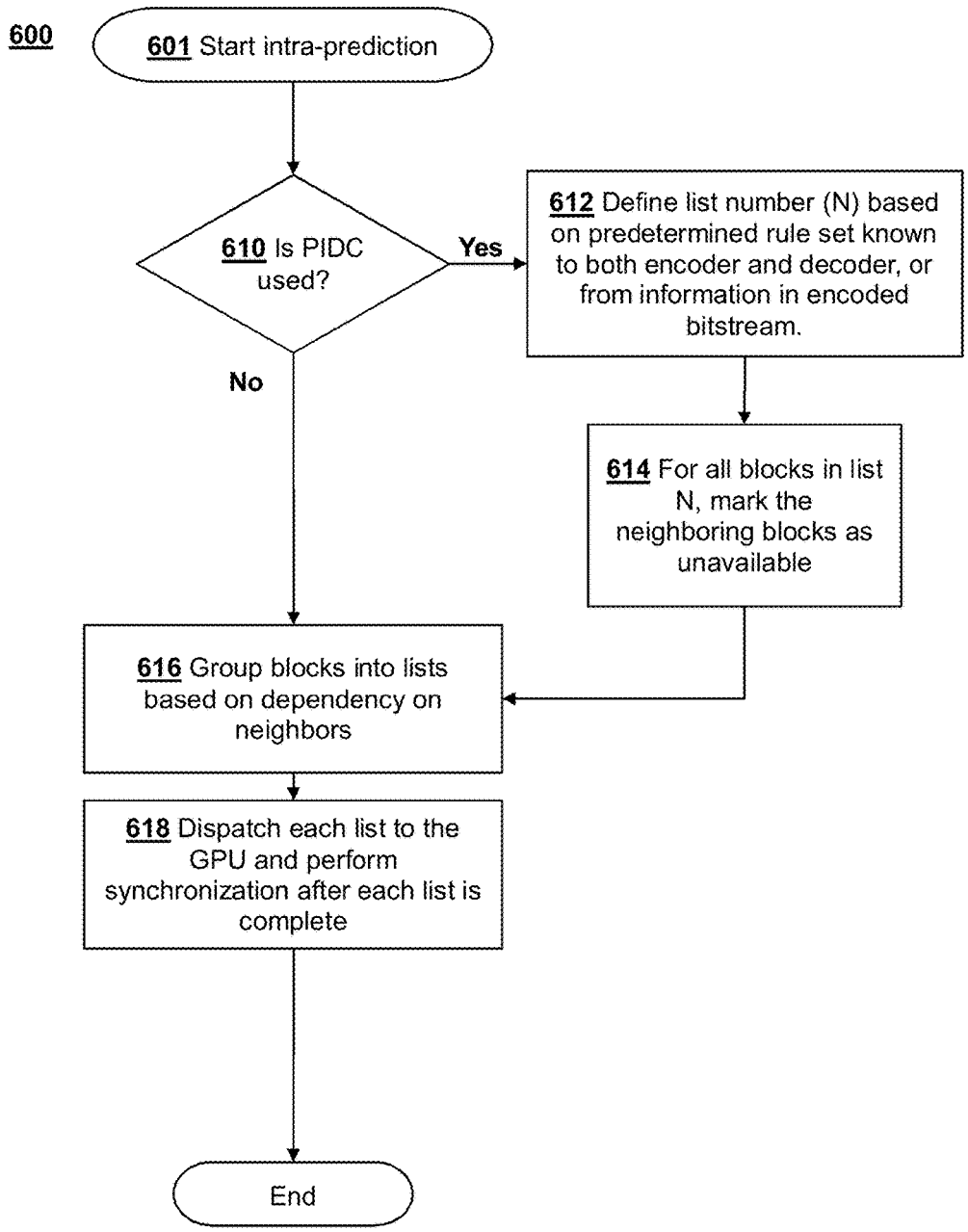
FIG. 6 is a flow diagram illustrating an example of decoding a picture encoded in accordance with aspects of the present disclosure.

Turning now to FIG. 6, an illustrative example of parallel intra-prediction decoding is provided. In particular, FIG. 6 depicts an example process flow 600 for decoding a digital picture using parallel intra-predication decoding in accordance with certain implementations of the present disclosure. It is important to note that the example of FIG. 6 is only a simplified example for purposes of illustrating only certain aspects of how a digital picture may be decoded in accordance with the present disclosure.

At the outset, it is important to note that in this example, a digital picture is undergoing the decoding process via the activity of a system utilizing PIPCM and/or PIDC. In this example, as shown in FIG. 6, intra-prediction is started 601 on the digital picture. In alternative implementations, the picture may have been encoded using PIDC, in which case the system may utilize PIDC to decode the picture. Depending on a variety of factors described above, an appropriate decoding method is chosen 610.

In some cases the type of encoding for a picture (e.g., PIPCM or PIDC) may be known to the decoding system beforehand. In other cases it may be useful for the system performing the encoding to notify the system that performs the decoding of the type of encoding used for the picture in order for the decoder to select an appropriate decoding method. In some situations, the notification may be transmitted over a network, which may be a personal area network, local area network, wide area network, wireless network, fiber optic network, satellite transmission network or other network between two remotely located systems. In some implementations, the notification may be included in a data packet containing part of the bitstream for the picture or in a header for such a data packet.

In certain embodiments, PIDC may be used, and the system may define list number (N) accordingly 612. The definition of list number (N) can be based, for example, on a predetermined rule set known to both the encoder and decoder utilized. Alternatively, list number (N) may be defined from information in the encoded bitstream. For all blocks in list N, neighboring blocks are marked unavailable 614. Subsequently, the blocks are grouped 616 into lists based on the modified dependency of the blocks on their neighboring blocks. Each list is then dispatched 618 to the GPU and synchronization is performed after each list is complete.

In alternative embodiments, wherein PIDC is not utilized, the system groups the blocks 616 into lists based on the dependency of the blocks on their neighboring blocks. Each list is then dispatched 618 to the GPU and synchronization is performed after each list is complete.

As shown in the example above, in PIDC, the blocks in List N are encoded using the DC mode, and the method to determine the availability of neighboring blocks is modified. According to the H.264 and HEVC standards, the DC mode utilizes neighboring luma or chroma samples for prediction unless the neighboring blocks are unavailable. But neighboring blocks are unavailable for prediction only for the first block of a slice, and are available for other blocks. By utilizing the DC mode for prediction and setting the neighboring blocks as unavailable, even if they are available in reality, the encoder forces a break in the dependency of the sections in list N on neighboring sections. Without modifying the decoder, the reconstructed data will not be accurate, as the decoder assumes that the neighbors are available for the blocks in List N and uses the neighbors for prediction. Therefore, in order to ensure accuracy of the decoded picture, both the encoder and the decoder should follow the same rules to decide the value of N, and also follow the same strategy for determining the availability of neighbors for all blocks in List N.

Figure 7:
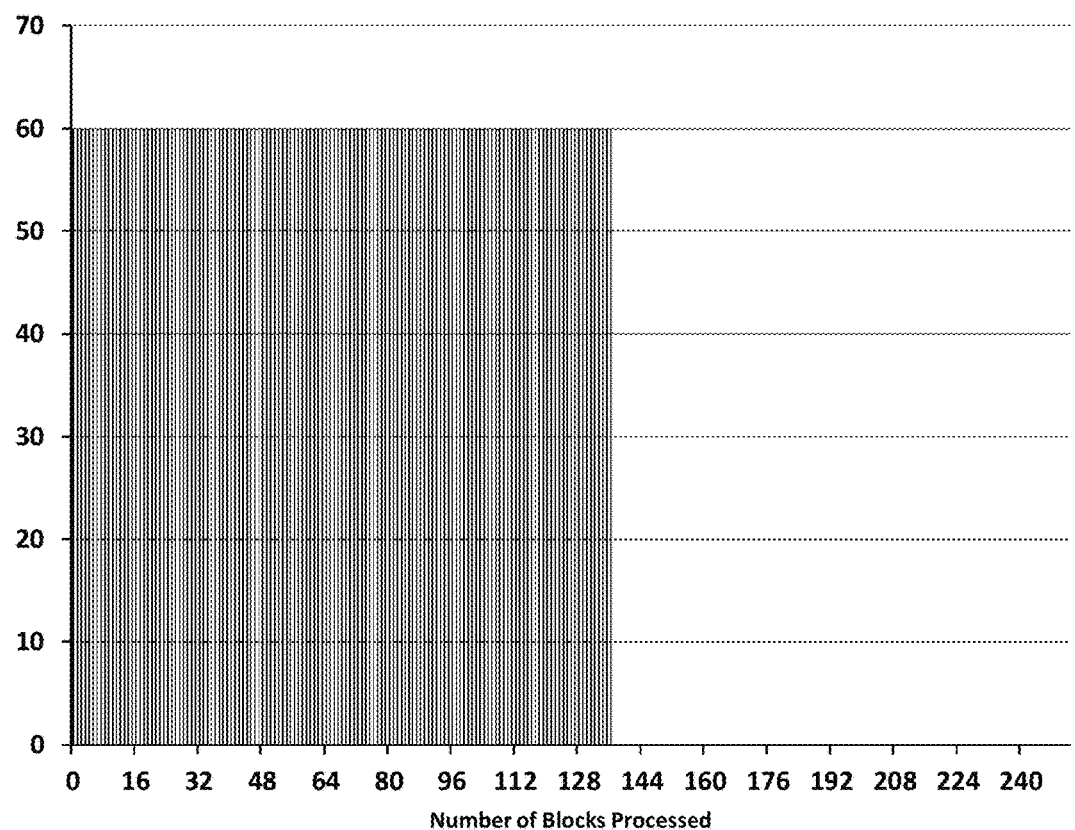
FIG. 7 is a graph illustrating the number of blocks that can be processed during each run of a compute shader that performs Intra-prediction in accordance with aspects of the present disclosure for a hypothetical example of a 1080 p picture with worst-case dependency.

The value of N is selected based on the requirement of the application. For fast decoding of 1080 p streams, a value of 135 could be chosen for N when the PIPCM method is used, and a value of 136 could be chosen for N for the PIDC method. With these values, the number of blocks that can be processed during each run of a compute shader is shown in FIG. 7, for worst-case dependency. The number of dispatches required is lower compared to the results shown in FIG. 3 for a conventional encoding algorithm, and the peak block processing rate is achieved for every dispatch without any ramp up period, which leads to good load balancing.

For ideal load balancing, the value of N depends on the picture height. For even faster decoding and error resilience, there could be multiple values of N according to the speedup required or number of independent sections needed. By way of example and not by way of limitation, a faster variation of PIDC for 1080 p may encode lists N, 2*N, and 3*N as DC, where N=68.

Figure 8:
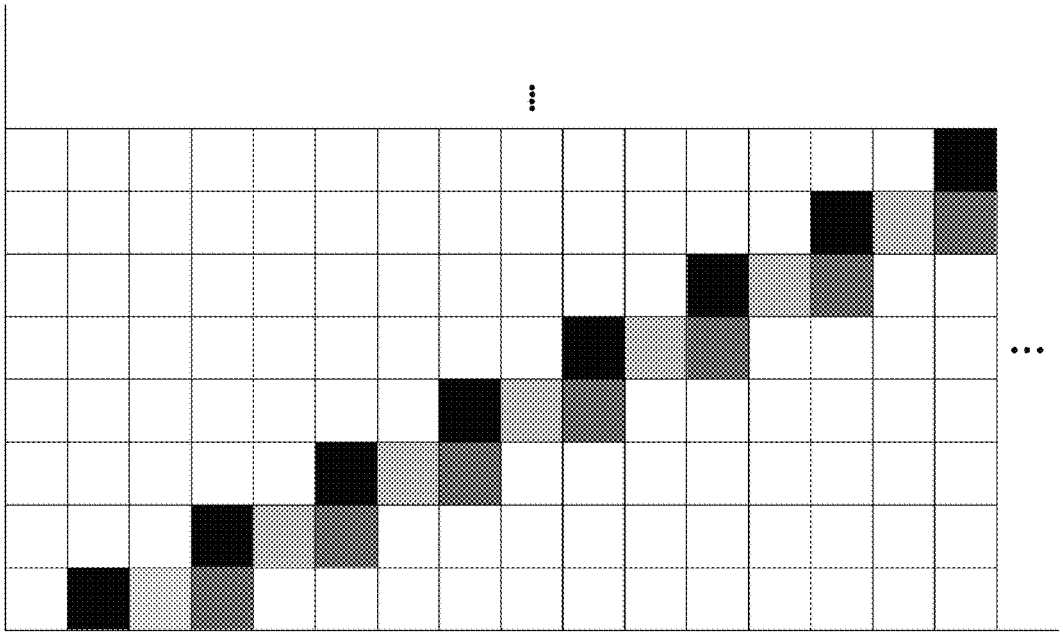
FIG. 8 is a schematic diagram illustrating the mode selection process when PIPCM mode is used to encode a digital picture in accordance with aspects of the present disclosure.
Figure 9:
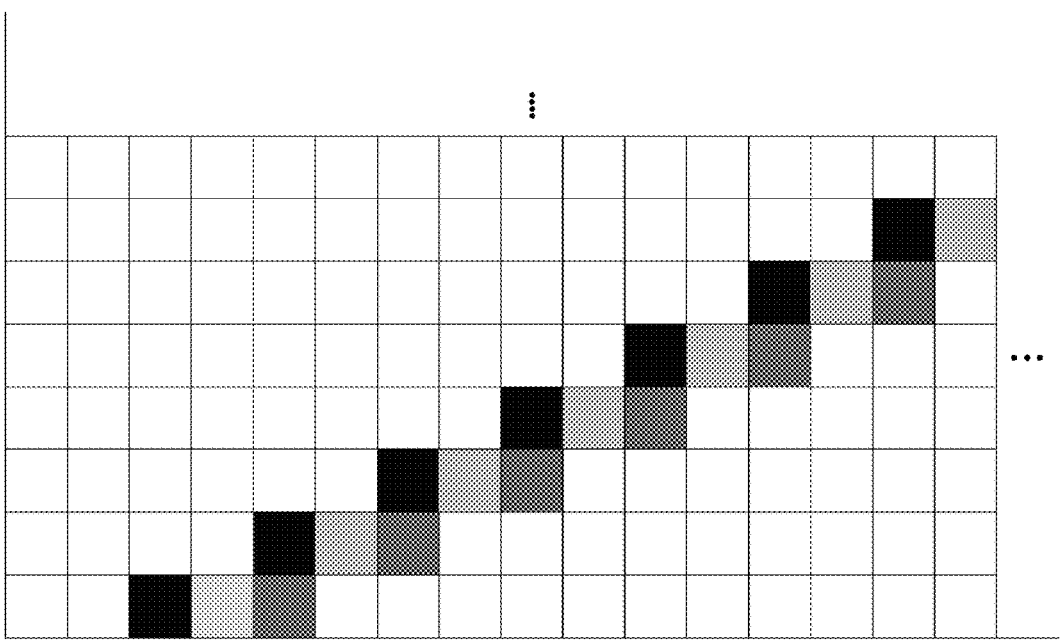
FIG. 9 is a schematic diagram illustrating the mode selection process when PIDC mode is used to encode a digital picture in accordance with aspects of the present disclosure.

FIG. 8 shows the mode selection process when PIPCM mode is used to encode a 1080 p picture, and the value of N chosen is 135. The blocks coded as PCM are shaded as black. Similarly, FIG. 9 shows the mode selection process when PIDC is used for encoding and the value of N is selected as 136. The blocks that do not have any dependency on neighbors due to the modified DC mode are indicated in black. For both FIG. 8 and FIG. 9, the blocks in light grey only use luma or chroma samples from the block to its left for prediction, and the blocks in medium gray do not use luma or chroma samples from the block to its above-left for prediction.

Figure 10:
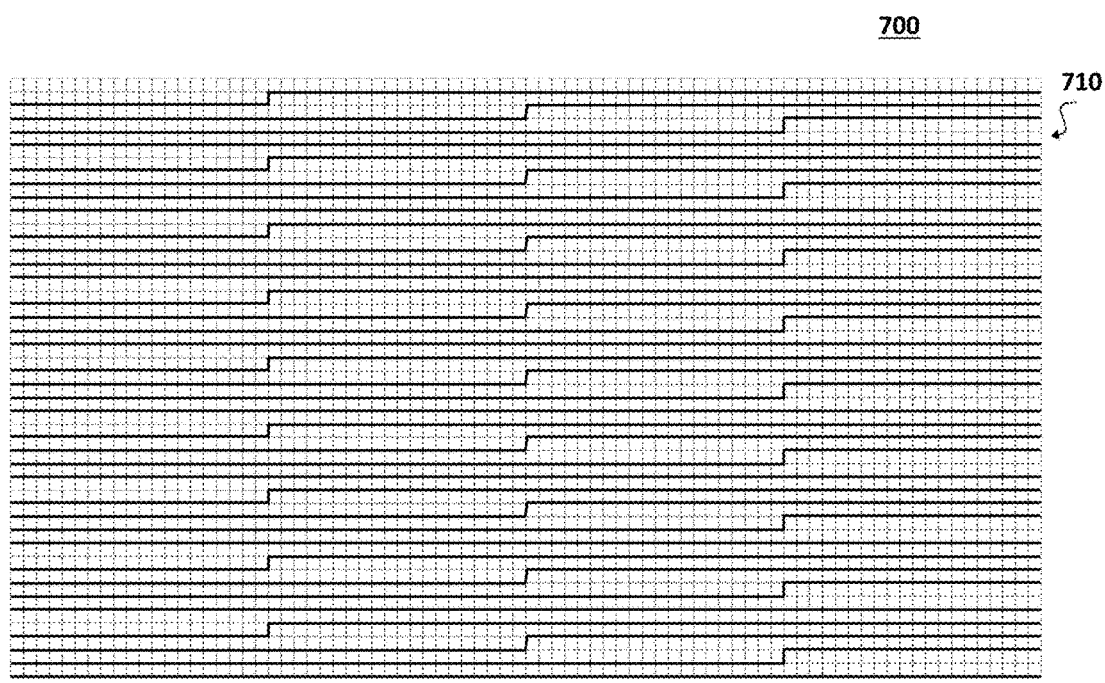
FIG. 10 is a schematic diagram of a digital picture divided into a conventional multiple-slice configuration with uniform number of blocks per slice in which the blocks within a slice can be encoded or decoded independent of blocks within other slices.

Besides applications in speeding up the encoding and decoding processes, parallel intra-prediction could also be used for improving error resilience for I-pictures. When single-slice bitstreams are used, any error in the I-picture results in incorrect decoded data starting from the block containing the error to the last block in the picture. With multiple-slices, the incorrect decoded data due to the error can be limited to the end of the slice. Typical multi-slice configurations for error resilience utilize either a fixed number of blocks per slice, or a fixed number of bits per slice. An example of a 36-slice 720 p picture 700 with 100 blocks in each slice 710 is shown in FIG. 10. This arrangement ensures that there are groups of 100 blocks that can be encoded and decoded independent of each other, which constrains any error in a section from crossing the boundary of the section. The disadvantages of using such a large number of slices are the overhead of slice headers and the large number of blocks with sub-optimal prediction.

Slices and tiles are used by H.264 and HEVC codecs to parallelize encoding and decoding processes. For faster encoding and decoding, a large number of slices could be used based on the video resolution (8-20 slices for 1080 p content that is not streamed over the network). But increasing the number of slices decreases the compression efficiency, so it is a trade-off. Slices are also used for error concealment to limit the number of sections that need to be concealed in case of error.

Figure 11:
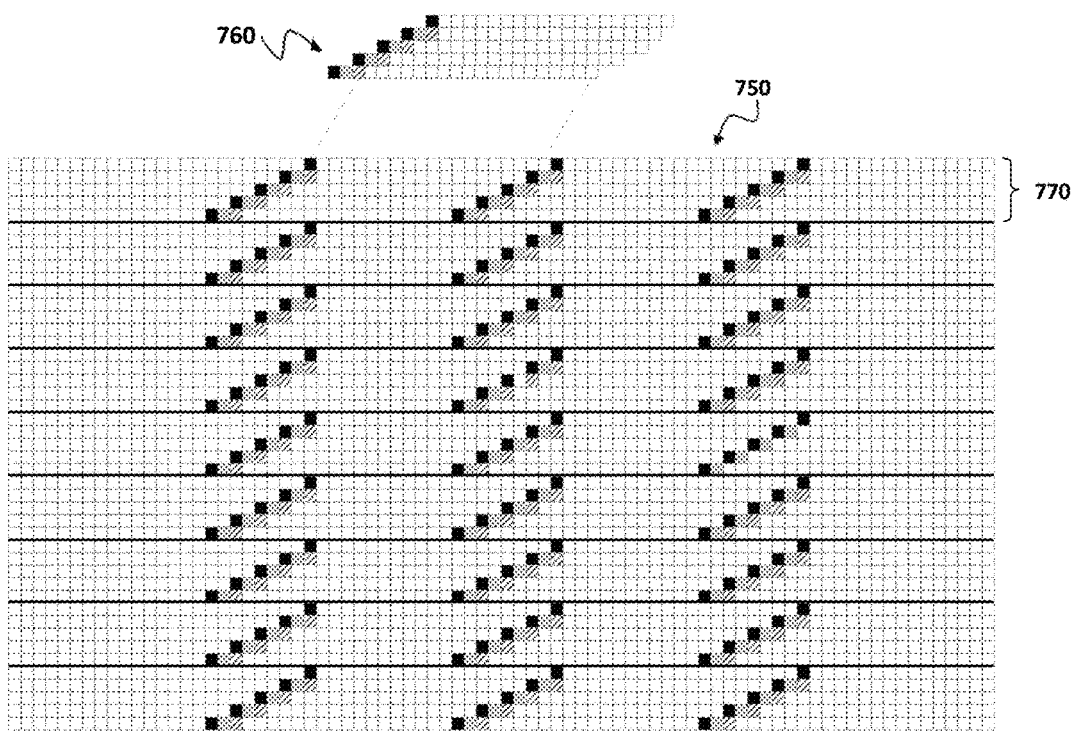
FIG. 11 is a schematic diagram of a digital picture divided into an alternative multiple-slice configuration in which multiple groups of blocks within each slice can be independently encoded or decoded in accordance with aspects of the present disclosure.

FIG. 11 shows an example of how parallel intra-prediction could be used to create 36 independently decodable segments 760 of 100 blocks each using only 9 slices 770 of a picture 750. This could be used for better error concealment for applications such as a Blu-Ray disc player. For cases where blocks from different lists are encoded as PCM/DC, we may use the block number in raster scan order or the position of the block in terms of row and column index to determine the location of the PCM/DC blocks. If the information about the blocks that are coded as PCM/DC is not included in the bitstream, the rules to determine the position of these blocks should be predetermined and known to the decoder.

Slices and tiles are defined in H.264 and HEVC standards and are used to parallelize encoding and decoding processes. Slices and tiles are groups of macroblocks/CTBs for which a majority of encoding and decoding tasks could be performed without any dependency on macroblocks/CTBs that do not belong to the slice or tile. The term 'segment' is used to refer to the groupings of blocks or other sections shown in FIG. 11 and FIG. 12 because these groups of blocks share this property of slices and tiles, but cannot be classified as slices or tiles according to the definition defined in the standard.

For dynamic determination of the position of the PCM/DC blocks, the required information for correct decoding could be stored in the bitstream as supplemental enhancement information (SEI). By using the parallel intra-prediction method, the decoder will be able to create a map of independently decodable segments using the position information of the PCM/DC blocks, and perform error concealment only for the segment containing an error instead of the entire slice, when the error in encountered during decoding of residual or predicted luma or chroma samples.

Figure 12:
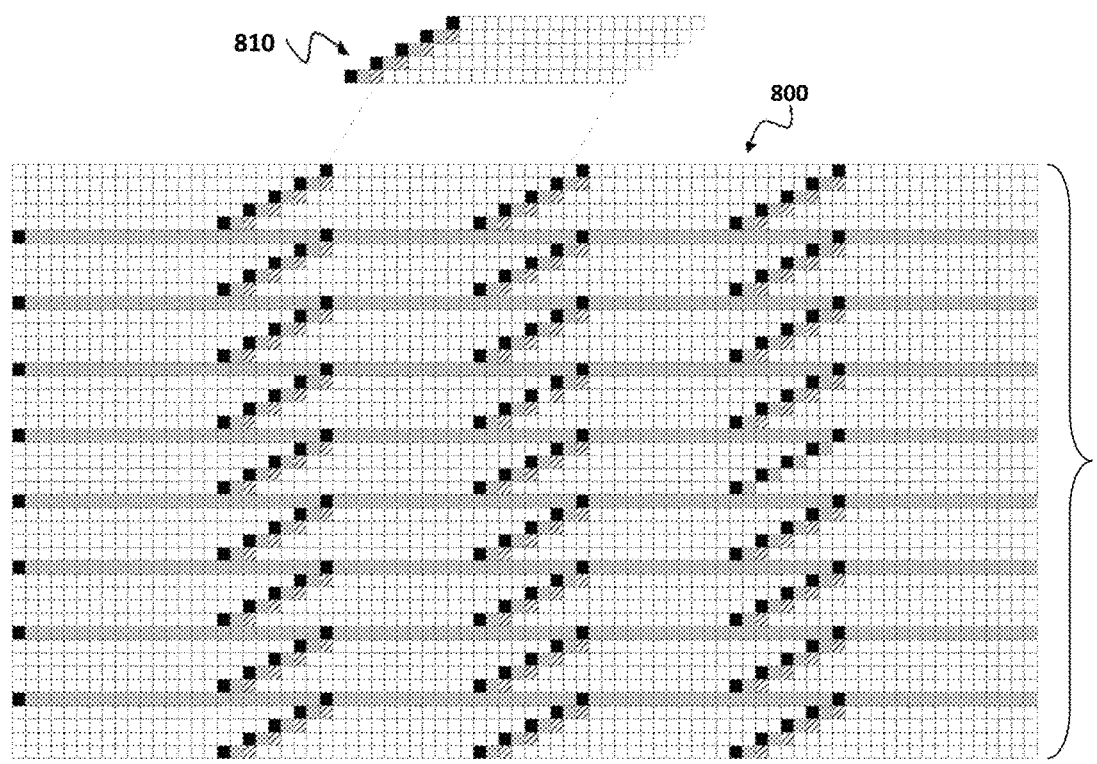
FIG. 12 is a schematic diagram of a digital picture divided into a single-slice configuration in which multiple groups of blocks within the slice can be encoded or decoded independent of one another in accordance with aspects of the present disclosure.

By defining a flag 'horizontal_run_mode' that when enabled, controls the prediction mode for all blocks between two successive PCM/DC modes, we could further reduce the number of slices needed for creating sections that are independent of each other. FIG. 12 shows how parallel intra-prediction and horizontal_run_mode could be used to create 36 independently decodable segments 810 of 100 blocks each using only 1 slice 820 of a picture 800.

Figure 13:
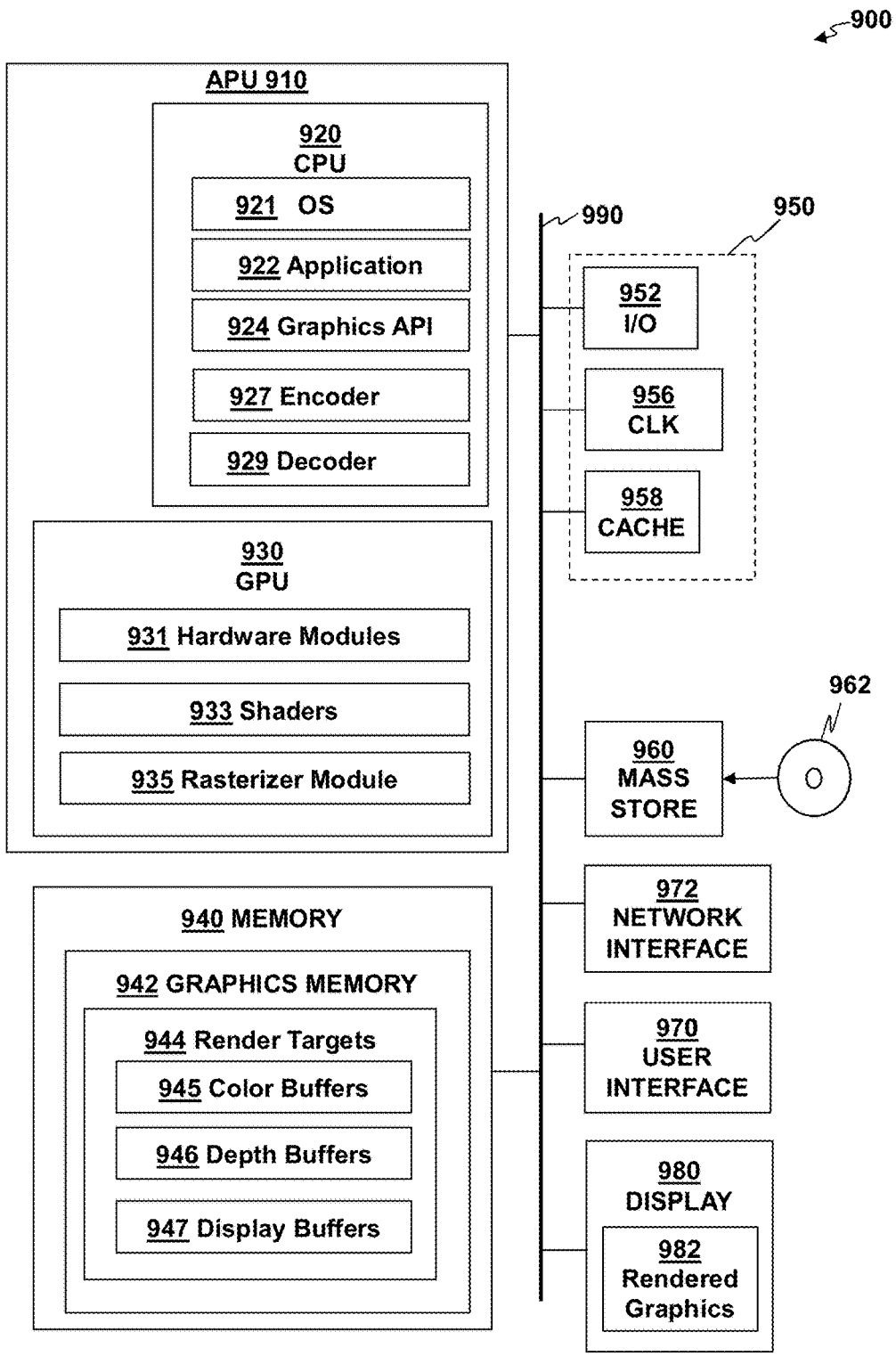
FIG. 13 is a block diagram of a device having an encoder and decoder capable of parallel intra-prediction encoding and decoding in accordance with aspects of the present disclosure

Turning now to FIG. 13, an illustrative example of a system 900 configured to operate in accordance with aspects of the present disclosure is depicted. According to aspects of the present disclosure, the system 900 may be an embedded system, mobile phone, personal computer, tablet computer, portable game device, workstation, game console, and the like.

The system 900 generally includes a central processor unit (CPU) 920 which may include a CPU core and other features of the type discussed above. By way of example and not by way of limitation, the CPU 920 may be part of an accelerated processing unit (APU) 910 that includes the CPU 920, and a graphics processing unit (GPU) 930 on a single chip. In alternative implementations, the CPU 920 and GPU 930 may be implemented as separate hardware components on separate chips.

The system 900 may also include memory 940. The memory 940 may optionally include a main memory unit that is accessible to the CPU 920 and GPU 930, and portions of the main memory may optionally include portions of the graphics memory 942. The CPU 920 and GPU 930 may each include one or more processor cores, e.g., a single core, two cores, four cores, eight cores, or more. The CPU 920 and GPU 930 may be configured to access one or more memory units using a data bus 990, and, in some implementations, it may be useful for the system 900 to include two or more different buses.

The memory 940 may include one or more memory units in the form of integrated circuits that provides addressable memory, e.g., RAM, DRAM, and the like. The memory may contain executable instructions configured to implement a method for encoding and/or decoding a picture in accordance with the embodiments described above. The graphics memory 942 may temporarily store graphics resources, graphics buffers, and other graphics data for a graphics rendering pipeline. The graphics buffers may include, e.g., one or more vertex buffers for storing vertex parameter values and one or more index buffers for storing vertex indices. The graphics buffers may also include a one or more render targets 944, which may include both color buffers 945 and depth buffers 946 holding pixel/sample values computed as a result of execution of instructions by the CPU 920 and GPU 930. In certain implementations, the color buffers 945 and/or depth buffers 946 may be used to determine a final array of display pixel color values to be stored in a display buffer 947, which may make up a final rendered image intended for presentation on a display. In certain implementations, the display buffer may include a front buffer and one or more back buffers, and the GPU 930 may be configured to scanout graphics frames from the front buffer of the display buffer 947 for presentation on a display 980.

The CPU 920 may be configured to execute CPU code, which may include operating system (OS) 921 or an application 922 (e.g., a video game). The OS 921 may be configured to implement certain features of operating the CPU 920 as discussed above. The CPU code may include a graphics application programming interface (API) 924 for issuing draw commands or draw calls to programs implemented by the GPU 930 based on a state of the application 922. The CPU code may also implement physics simulations and other functions. In some implementations, the CPU 920 may include an encoder 927 or decoder 929 configured to implement video encoding and decoding tasks including, but not limited to, encoding and/or decoding a picture in accordance with the embodiments described above. In an alternative implementation, the encoder 927 and decoder 929 may be part of a video coding engine that includes both the encoder and decoder, wherein the video coding engine may be implemented in hardware, in software, or in some combination of hardware and software. The encoder 927 and decoder 929 may be respectively configured to implement video encoding and decoding tasks including, but not limited to, encoding and/or decoding a picture in accordance with the embodiments described above. In an alternative implementation, the encoder and decoder may be part of a video coding engine that includes both the encoder and decoder, wherein the video coding engine may be implemented in hardware, in software, or in some combination of hardware and software. In hardware implementations the video coding engine hardware may be part of the CPU 920, part of the GPU 930, a separate hardware component of the APU 910 or a separate hardware component from the APU, CPU, and GPU. In some software implementations the encoder 927 and decoder 929 may be partly or wholly implemented by execution of coded instructions with the GPU 930.

To support the rendering of graphics, the GPU 930 may execute shaders 933, which may include vertex shaders and pixel shaders. The GPU 930 may also execute other shader programs, such as, e.g., geometry shaders, tessellation shaders, compute shaders, and the like. The GPU may also include specialized hardware modules 931, which may include one or more texture mapping units and/or other hardware modules configured to implement operations at one or more stages of a graphics pipeline, which may be fixed function operations. The shaders 933 and hardware modules 931 may interface with data in the memory 940 and the buffers 944 at various stages in the pipeline before the final pixel values are output to a display 980. The GPU 930 may include a rasterizer module 935, which may be optionally embodied in a hardware module 931 of the GPU, a shader 933, or a combination thereof. The rasterization module 935 may be configured take multiple samples of primitives for screen space pixels and invoke one or more pixel shaders according to the nature of the samples.

The system 900 may also include well-known support functions 950, which may communicate with other components of the system, e.g., via the bus 990. Such support functions may include, but are not limited to, input/output (I/O) elements 952, one or more clocks 956, which may include separate clocks for the CPU and GPU, respectively, and one or more levels of cache 958, which may be external to the CPU 920. The system 900 may optionally include a mass storage device 960 such as a disk drive, CD-ROM drive, flash memory, tape drive, Blu-ray drive, or the like to store programs and/or data. In one example, the mass storage device 960 may receive a computer readable medium 962 containing video data to be encoded and/or decoded. Alternatively, the application 962 (or portions thereof) may be stored in memory 940 or partly in the cache 958.

The device 900 may also include a display unit 980 to present rendered graphics 982 prepared by the GPU 930 to a user. The device 900 may also include a user interface unit 970 to facilitate interaction between the system 900 and a user. The display unit 980 may be in the form of a flat panel display, cathode ray tube (CRT) screen, touch screen, head mounted display (HMD) or other device that can display text, numerals, graphical symbols, or images. The display 980 may display rendered graphics 982 processed in accordance with various techniques described herein. The user interface 970 may contain one or more peripherals, such as a keyboard, mouse, joystick, light pen, game controller, touch screen, and/or other device that may be used in conjunction with a graphical user interface (GUI). In certain implementations, the state of the application 922 and the underlying content of the graphics may be determined at least in part by user input through the user interface 970, e.g., where the application 922 includes a video game or other graphics intensive application.

The system 900 may also include a network interface 972 to enable the device to communicate with other devices over a network. The network may be, e.g., a local area network (LAN), a wide area network such as the internet, a personal area network, such as a Bluetooth network or other type of network. Various ones of the components shown and described may be implemented in hardware, software, or firmware, or some combination of two or more of these.

Aspects of the present disclosure facilitate parallelization of encoding and decoding of digital pictures in a way that can be implemented in a fairly straightforward manner with modified versions of existing codec software or hardware. In some implementations, no modification is required on the decoder side. In others the modifications are straightforward.

While the above is a complete description of the preferred embodiment of the present invention, it is possible to use various alternatives, modifications and equivalents. Therefore, the scope of the present invention should be determined not with reference to the above description but should, instead, be determined with reference to the appended claims, along with their full scope of equivalents. Any feature described herein, whether preferred or not, may be combined with any other feature described herein, whether preferred or not. In the claims that follow, the indefinite article "A", or "An" refers to a quantity of one or more of the item following the article, except where expressly stated otherwise. As used herein, in a listing of elements in the alternative, the word "or" is used in the logical inclusive sense, e.g., "X or Y" covers X alone, Y alone, or both X and Y together, except where expressly stated otherwise. Two or more elements listed as alternatives may be combined together. The appended claims are not to be interpreted as including means-plus-function limitations, unless such a limitation is explicitly recited in a given claim using the phrase "means for."

What is claimed is:

1. A method, comprising:
   encoding selected sections of a digital picture in a first list, wherein each section in the first list is encoded independently of encoding any of its neighbors;
   encoding selected sections of the digital picture in a second list, wherein each section in the second list is located to the right of a corresponding section in the first list and wherein each section in the second list is encoded using at most the section to its immediate left;
   encoding selected sections of the digital picture in a third list, wherein each section in the third list is located to the right of a corresponding section in the second list and immediately below a corresponding section in the first list, wherein each section in the third list is encoded using at most the sections to its immediate left, immediately above it and immediately to its above-right; and
   encoding all other sections of the digital picture.

2. The method of claim 1, wherein each section in the first list is encoded using pulse code modulation.

3. The method of claim 1, wherein each section of the first list is encoded using a mode that encodes a section as a fixed value when certain neighboring blocks are unavailable.

4. The method of claim 3, wherein encoding the selected sections of the digital picture in the first list includes designating the certain neighboring sections of each block in the first list as unavailable.

5. The method of claim 1, further comprising dividing the digital picture into two or more slices.

6. The method of claim 5, wherein the sections of the first, second, and third lists are selected to divide the picture into two or more groups of sections that are decodable in parallel.

7. The method of claim 1, wherein the digital picture is encoded as a single slice.

8. The method of claim 7, wherein the sections of the first, second, and third lists are selected to divide the picture into two or more groups of sections that are decodable in parallel.

9. The method of claim 1, wherein encoding the selected sections of the digital picture in the first, second, or third list includes dividing one or more selected sections in the first, second, or third list into smaller sized sub-units and encoding two or more of the smaller sized sub-units in different modes selected to reduce or minimize a number of bits required to encode the one or more selected sections.

10. A system, comprising:
    a processor;
    a memory; and
    processor executable instructions embodied in the memory, the instructions being configured to implement a method upon execution by the processor, the method comprising:
    a) encoding selected sections of a digital picture in a first list, wherein each section in the first list is encoded independently of encoding of any of its neighbors;
    b) encoding selected sections of the digital picture in a second list, wherein each section in the second list is located to the right of a corresponding section in the first list and wherein each section in the second list is encoded using at most the section to its immediate left;
    c) encoding selected sections of the digital picture in a third list, wherein each section in the third list is located to the right of a corresponding section in the second list and immediately below a corresponding section in the first list, wherein each section in the third list is encoded using at most the sections to its immediate left, immediately above it and immediately to its above-right;
    d) and encoding all other sections of the digital picture.

11. A non-transitory computer readable medium having computer readable instructions embodied therein, the instructions being configured to implement a method upon execution by a processor, the method comprising:
    a) encoding selected sections of a digital picture in a first list, wherein each section in the first list is encoded independently of encoding of any of its neighbors;
    b) encoding selected sections of the digital picture in a second list, wherein each section in the second list is located to the right of a corresponding section in the first list and wherein each section in the second list is encoded using at most the section to its immediate left;
    c) encoding selected sections of the digital picture in a third list, wherein each section in the third list is located to the right of a corresponding section in the second list and immediately below a corresponding section in the first list, wherein each section in the third list is encoded using at most the sections to its immediate left, immediately above it and immediately to its above-right;
    d) and encoding all other sections of the digital picture.

* * * * *